US 9,410,669 B2

(12) United States Patent
Jungwirth et al.

(10) Patent No.: US 9,410,669 B2
(45) Date of Patent: Aug. 9, 2016

(54) MULTI-LAMP SOLAR SIMULATOR

(71) Applicant: The Boeing Company, Chicago, IL (US)

(72) Inventors: Douglas R. Jungwirth, Porter Ranch, CA (US); Emilio Quezada, Sylmar, CA (US)

(73) Assignee: The Boeing Company, Chicago, IL (US)

( * ) Notice: Subject to any disclaimer, the term of this patent is extended or adjusted under 35 U.S.C. 154(b) by 490 days.

(21) Appl. No.: 13/860,285

(22) Filed: Apr. 10, 2013

(65) Prior Publication Data
US 2014/0307411 A1   Oct. 16, 2014

(51) Int. Cl.
*F21S 8/00* (2006.01)
*H05B 37/02* (2006.01)

(52) U.S. Cl.
CPC ............. *F21S 8/006* (2013.01); *H05B 37/0218* (2013.01); *Y02B 20/46* (2013.01)

(58) Field of Classification Search
CPC . F21S 8/006; H05B 31/00; G02B 2027/0118; G02B 2027/014; G02B 2027/0147; G02B 2027/0112; G02B 27/0101; G02B 27/286; G06F 3/04815; G06F 3/0482; G06F 3/14; G06T 7/004; G06T 19/20; G06T 5/00; G06T 7/0018; G09G 3/3225; G09G 3/3233; G09G 5/14; H04N 2013/0465; B32B 2551/00; G02F 1/133602; G01J 2005/0077; G01J 3/0289; G01J 3/28; G01N 21/255; G03B 21/008; G03B 21/2033; G03B 27/547
USPC .......................................................... 362/1, 2
See application file for complete search history.

(56) References Cited

U.S. PATENT DOCUMENTS

| 4,789,989 | A | 12/1988 | Stern et al. |
| 5,217,285 | A * | 6/1993 | Sopori .............................. 362/1 |
| 8,016,439 | B2 | 9/2011 | Igari |
| 8,198,821 | B2 | 6/2012 | Shimotomai et al. |
| 8,378,661 | B1 | 2/2013 | Cravey |
| 2007/0206901 | A1 | 9/2007 | Bonitatibus et al. |
| 2012/0206913 | A1 | 8/2012 | Jungwirth et al. |

FOREIGN PATENT DOCUMENTS

DE   11 2011 100041   6/2012

OTHER PUBLICATIONS

Extended European Search Report, EP 14 15 5951 (Jul. 16, 2015).

* cited by examiner

*Primary Examiner* — Evan Dzierzynski
*Assistant Examiner* — Danielle Allen
(74) *Attorney, Agent, or Firm* — Walters & Wasylyna LLC

(57) ABSTRACT

A solar simulator including an array of lamp modules, wherein each lamp module of the array includes a lamp configured to generate light, a homogenizer having an input end and an output end, a beam divergence lens positioned to focus the light onto the input end of the homogenizer, and an imaging lens positioned to receive the light from the output end of the homogenizer and image the light onto a target plane.

18 Claims, 5 Drawing Sheets

MULTI-LAMP SOLAR SIMULATOR

FIELD

The present patent application relates to illumination and, more particularly, to artificial solar illumination.

BACKGROUND

Solar cells convert the sun's energy into useful electrical energy by way of the photovoltaic effect. Modern multijunction solar cells operate at efficiencies significantly higher than traditional, silicon solar cells, with the added advantage of being lightweight. Therefore, solar cells provide a reliable, lightweight and sustainable source of electrical energy suitable for a variety of terrestrial and space applications.

During the design and manufacture of solar cells, there is often a need to test solar cells for power generation and overall operating efficiency. One option for testing solar cells is exposing the solar cells to natural sunlight, as if the solar cells were in deployment. However, for a variety of reasons, it is often not practical (or even feasible) to expose test solar cells to natural sunlight.

Thus, solar simulators have been developed as an alternative to testing solar cells with natural sunlight. Advantageously, solar simulators facilitate the indoor testing of solar cells under controlled laboratory conditions.

Unfortunately, many traditional solar simulators produce a limited area of illumination and, therefore, are not suitable for testing large solar cells and solar cell arrays. Furthermore, while the illumination produced by traditional solar simulators may resemble the spectral distribution of natural sunlight, there are often discrepancies in the spectral distribution and the spatial uniformity of the generated illumination that may compromise test results. Solar simulators having a more precise spectral distribution and greater spatial uniformity typically are large, must be operated continuously, and have a relatively short lamp life.

Accordingly, those skilled in the art continue with research and development efforts in the field of artificial solar illumination.

SUMMARY

In one embodiment, the disclosed multi-lamp solar simulator may include an array of lamp modules, wherein each lamp module of the array includes a lamp configured to generate light, a homogenizer having an input end and an output end, a beam divergence lens positioned to focus the light onto the input end of the homogenizer, and an imaging lens positioned to receive the light from the output end of the homogenizer and image the light onto a target plane.

In another embodiment, the disclosed multi-lamp solar simulator may include an array of lamp modules, wherein each lamp module of the array includes a lamp configured to generate light, a spectral filter positioned to receive the light and output either full spectrum light or light within a specific band, a homogenizer having an input end and an output end, a beam divergence lens positioned to focus the filtered light onto the input end of the homogenizer, an imaging lens positioned to receive the light from the output end of the homogenizer and image the light onto a target plane, and an iris positioned to control the percentage of light that passes to the target plane.

In another embodiment, the disclosed multi-lamp solar simulator may include at least a first lamp module and a second lamp module. The first lamp module may include a first lamp configured to generate a first light, a first spectral filter positioned to receive the first light and output substantially full spectrum light, a first homogenizer having a first input end and a first output end, a first beam divergence lens positioned to focus the full spectrum light onto the first input end of the first homogenizer, a first imaging lens positioned to receive the full spectrum light from the first output end of the first homogenizer and image the full spectrum light onto a target plane, a first iris positioned between the first imaging lens and the target plane. The second lamp module may include a second lamp configured to generate a second light, a second spectral filter positioned to receive the second light and output a specific band of light, a second homogenizer having a second input end and a second output end, a second beam divergence lens positioned to focus the specific band of light onto the second input end of the second homogenizer, a second imaging lens positioned to receive the specific band of light from the second output end of the second homogenizer and image the specific band of light onto the target plane, a second iris positioned between the second imaging lens and the target plane.

In yet another embodiment, disclosed is a method for illuminating a target plane. The method may include the steps of (1) providing an array of lamp modules, wherein each lamp module of the array outputs light having an intensity, the output light being either full spectrum light or a specific band of light; (2) passing the light from each lamp module through a homogenizer; (3) imaging onto a target plane the homogenized light from each lamp module; and (4) controlling the intensity of the light from each lamp module.

Other embodiments of the disclosed multi-lamp solar simulator and method will become apparent from the following detailed description, the accompanying drawings and the appended claims.

DETAILED DESCRIPTION

Figure 1:
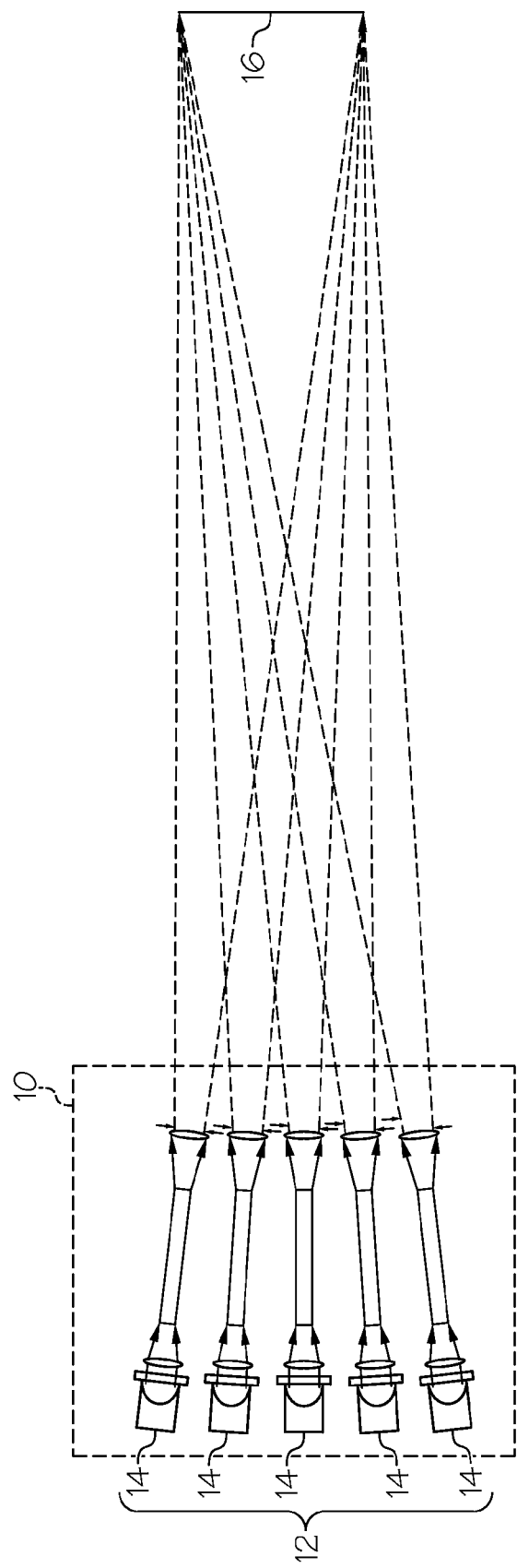
FIG. 1 is a schematic representation of one embodiment of the disclosed multi-lamp solar simulator, shown illuminating a target plane.

Referring to FIG. 1, one embodiment of the disclosed multi-lamp solar simulator, generally designated 10, may include an array 12 of lamp modules 14. The lamp modules 14 may be focused on, and may illuminate, a target plane 16.

Figure 2:
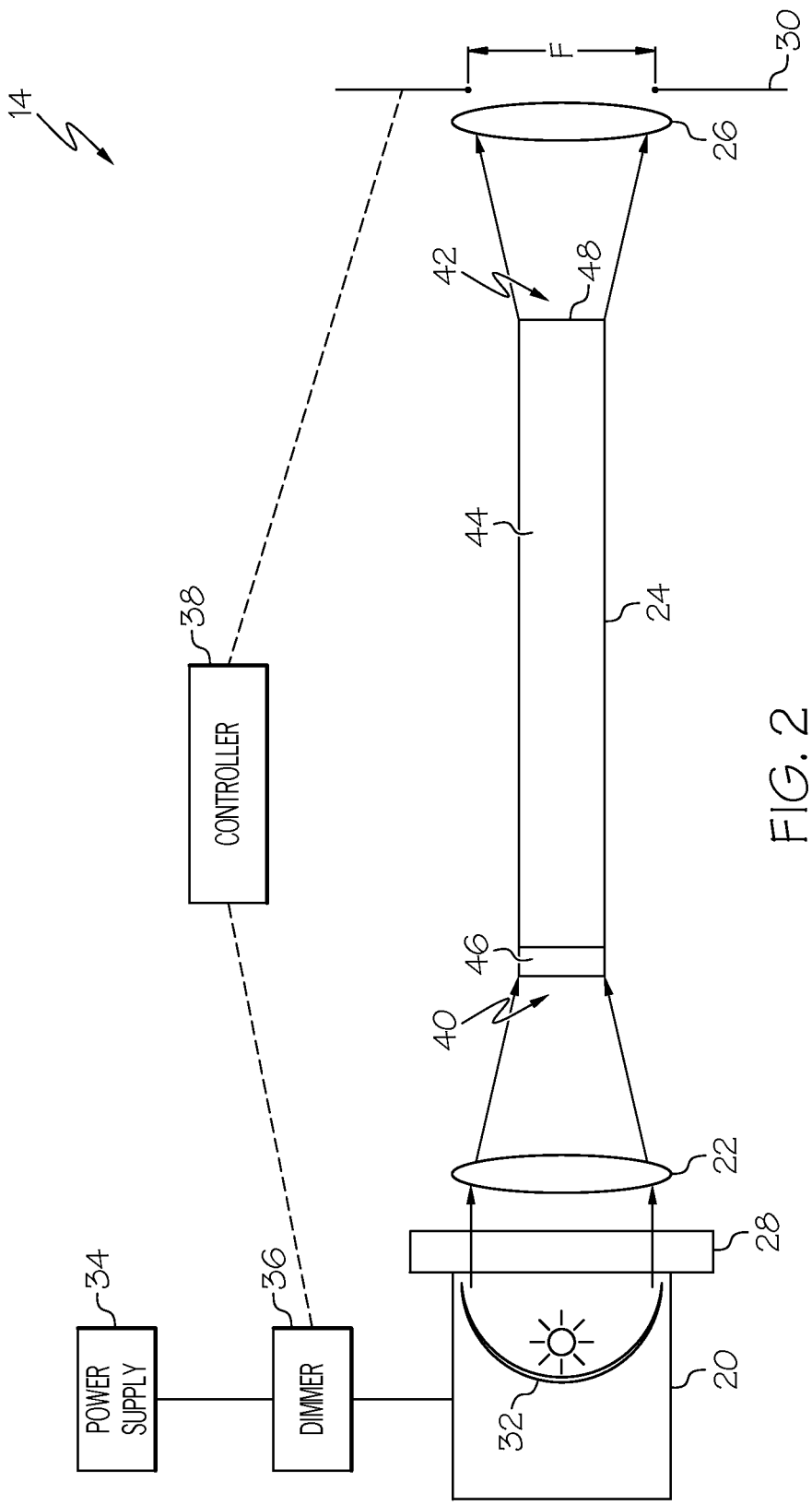
FIG. 2 is a detailed schematic representation of a lamp module of the multi-lamp solar simulator of FIG. 1.

Referring to FIG. 2, each lamp module 14 of the array 12 (FIG. 1) may include a lamp 20, a beam divergence lens 22, a homogenizer 24 and an imaging lens 26. Additionally, the lamp module 14 may include a spectral filter 28 and/or an iris 30.

The lamp 20 may generate the light (represented with arrows in FIG. 2) associated with the lamp module 14. The light may have an initial intensity. The lamp 20 may include a mirror 32 configured to project the generated light from the lamp 20 in the direction of interest.

The lamp 20 may be any suitable light source having a spectrum that overlaps the range from infrared to ultraviolet. In one particular construction, the lamp 20 may be a light source capable of generating full spectrum light (i.e., light that substantially covers the electromagnetic spectrum from proximate the infrared to proximate the near ultraviolet). As one specific, non-limiting example, the lamp 20 may be a xenon arc lamp and may have a color temperature of about 6,000° K to about 6,500° K. As another specific, non-limiting example, the lamp 20 may be a krypton arc lamp and may have a color temperature of about 5,500° K to about 6,000° K.

The lamp 20 may receive electrical energy from a power supply 34, such a battery or the electrical grid. The power supply 34 may be a shared power supply wherein each lamp module 14 of the array 12 (FIG. 1) may be powered by the same power supply. Alternatively, the lamp 20 of each lamp module 14 may have its own designated power supply.

A variable voltage/current device 36, such as a dimmer switch, may control the power supplied to the lamp 20 and, thus, the initial intensity of the light generated by the lamp 20. The variable voltage/current device 36 may be a manual device or, alternatively, may be controlled by a controller 38 (e.g., a computer). Each lamp module 14 of the array 12 (FIG. 1) may have its own designated variable voltage/current device 36 such that the power supplied to the lamp 20 of one lamp module 14 may be controlled independently of the other lamp modules 14 of the array 12.

The spectral filter 28 may be positioned to receive and filter the light generated by the lamp 20. Various spectral filters 28 may be used. As one example, the spectral filter 28 may filter the light generated by the lamp 20 to provide full spectrum illumination (i.e., illumination that substantially covers the electromagnetic spectrum from proximate the infrared to proximate the near ultraviolet). As another example, the spectral filer 28 may filter the light generated by the lamp 20 to provide light within a specific, non-full spectrum band (e.g., red, blue) of the electromagnetic spectrum.

The type of spectral filter 28 used may vary from lamp module 14 to lamp module 14 within the array 12 (FIG. 1). Selection of the type of spectral filter 28 used for a given lamp module 14 may depend on the intended application of the simulator 10 and the location of the lamp module 14 within the array 12, among other possible factors.

Figure 3:
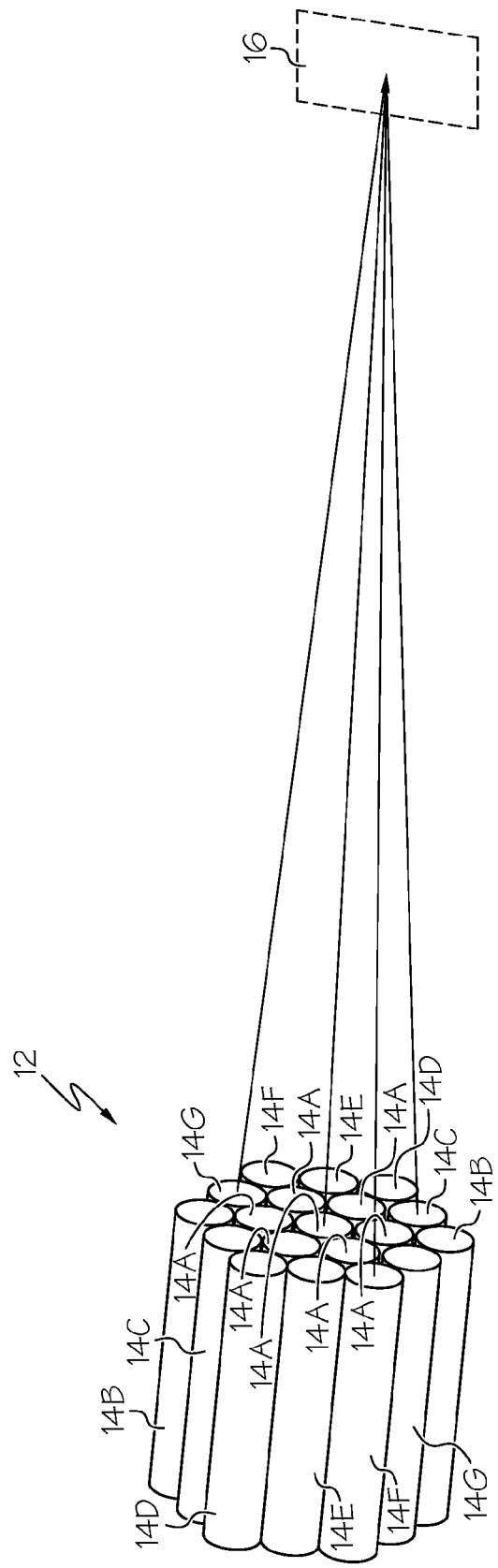
FIG. 3 is a schematic representation of another embodiment of the disclosed multi-lamp solar simulator, shown illuminating a target plane.

As one non-limiting example, the array 12 may include nineteen lamp modules 14A, 14B, 14C, 14D, 14E, 14F, 14G, as shown in FIG. 3. Lamp modules 14A (five total in the array 12) may be positioned at the center of the array 12 and may include a spectral filter 28 (FIG. 2) that provides full spectrum illumination. Lamp modules 14B (two total in the array 12) may be positioned on the outside (proximate the periphery) of the array 12 and opposed from each other, and may include a spectral filter 28 that provides illumination in the red band (e.g., about 620 nm to about 750 nm) of the electromagnetic spectrum. Lamp modules 14C (two total in the array 12) may be positioned on the outside of the array 12 and opposed from each other, and may include a spectral filter 28 that provides illumination in the orange band (e.g., about 590 nm to about 620 nm) of the electromagnetic spectrum. Lamp modules 14D (two total in the array 12) may be positioned on the outside of the array 12 and opposed from each other, and may include a spectral filter 28 that provides illumination in the yellow band (e.g., about 570 nm to about 590 nm) of the electromagnetic spectrum. Lamp modules 14E (two total in the array 12) may be positioned on the outside of the array 12 and opposed from each other, and may include a spectral filter 28 that provides illumination in the green band (e.g., about 495 nm to about 570 nm) of the electromagnetic spectrum. Lamp modules 14F (two total in the array 12) may be positioned on the outside of the array 12 and opposed from each other, and may include a spectral filter 28 that provides illumination in the blue band (e.g., about 450 nm to about 495 nm) of the electromagnetic spectrum. Lamp modules 14G (two total in the array 12) may be positioned on the outside of the array 12 and opposed from each other, and may include a spectral filter 28 that provides illumination in the violet band (e.g., about 380 nm to about 450 nm) of the electromagnetic spectrum.

While the nineteen lamp modules 14A, 14B, 14C, 14D, 14E, 14F, 14G are shown in FIG. 3 in a closely packed hex pattern, those skilled in the art will appreciate that other patterns and combinations of lamp modules 14 may be used without departing from the scope of the present disclosure. For example, non-symmetrical and random configurations are also contemplated.

Furthermore, while lamp modules 14B, 14C, 14D, 14E, 14F, 14G are described above as being filtered to provide light within a specific visible band of the electromagnetic spectrum, filtering to provide an infrared band (e.g., about 1000 nm to about 750 nm) or an ultraviolet band (e.g., about 100 nm to about 380 nm) is also contemplated.

Figure 4:
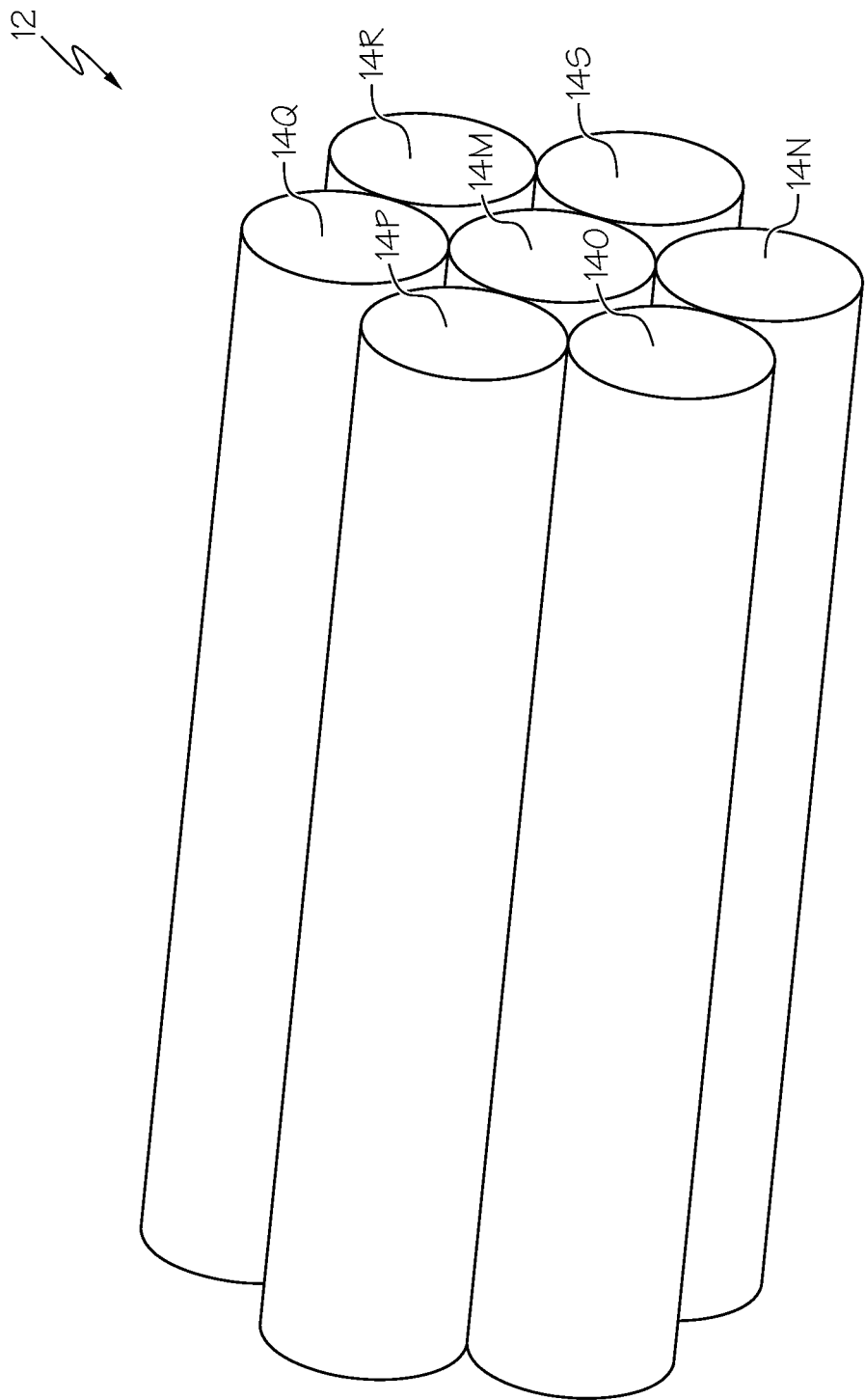
FIG. 4 is a schematic representation of yet another embodiment of the disclosed multi-lamp solar simulator.

As another non-limiting example, the array 12 may include seven lamp modules 14M, 14N, 14O, 14P, 14Q, 14R, 14S, as shown in FIG. 4. Lamp module 14M may be positioned at the center of the array 12 and may include a spectral filter 28 (FIG. 2) that provides full spectrum illumination. Lamp module 14N may be positioned on the outside of the array 12 and may include a spectral filter 28 that provides illumination in the red band of the electromagnetic spectrum. Lamp module 14O may be positioned on the outside of the array 12 and may include a spectral filter 28 that provides illumination in the orange band of the electromagnetic spectrum. Lamp module 14P may be positioned on the outside of the array 12 and may include a spectral filter 28 that provides illumination in the yellow band of the electromagnetic spectrum. Lamp module 14Q may be positioned on the outside of the array 12 and may include a spectral filter 28 that provides illumination in the blue band of the electromagnetic spectrum. Lamp module 14R may be positioned on the outside of the array 12 and may include a spectral filter 28 that provides illumination in the violet band of the electromagnetic spectrum. Lamp module 14S may be positioned on the outside of the array 12 and may include a spectral filter 28 that provides illumination in the indigo band of the electromagnetic spectrum.

Referring back to FIG. 2, the beam divergence lens 22 may focus the light generated by the lamp 20 onto the input end 40 of the homogenizer 24. Therefore, the beam divergence lens 22 may define the input and output divergence angle of the homogenizer 24.

The homogenizer 24 may receive the light from the beam divergence lens 22 and may spatially redistribute the light. Therefore, the output end 42 of the homogenizer 24 may output light having a substantially uniform spatial distribution.

The homogenizer 24 may include a waveguide 44 (or a plurality of waveguides 44) extending from proximate (at or near) the input end 40 to proximate the output end 42. The waveguide 44 may function due to total internal reflection or may be coated with a suitable high reflectivity coating. A diffuser 46 may be positioned proximate the input end 40 of the homogenizer 24 to diffract the incoming light. The output end 42 of the homogenizer 24 may include a polished surface 48.

The imaging lens 26 may receive the light from the output end 42 of the homogenizer 24 and may image the light onto the target plane 16 (FIG. 1). Those skilled in the art will appreciate that the focal length and placement of the imaging lens 26 may define the magnification of the imaged light at the target plane 16. As one specific, non-limiting example, the imaged light may have an illumination area on the target plane 16 of about 30 cm by about 30 cm. Of course, smaller or even larger illumination areas may be achieved.

The imaged light from the imaging lens 26 may pass through the iris 30 on its way to the target plane 16 (FIG. 1). The aperture size F of the iris 30 may be manipulated to control the percentage of imaged light that is projected onto the target plane 16. Specifically, the iris 30 may be opened (e.g., aperture size F increased) to project a larger percentage of imaged light onto the target plane 16 or may be closed (e.g., aperture size F reduced) to project a smaller percentage of imaged light onto the target plane 16. Those skilled in the art will appreciate that changing the percentage of light transmitted by way of the iris 30 may not result in a change in the spatial distribution of the transmitted light.

In one variation, the iris 30 may be a manual iris, such as an iris diaphragm that opens or closes in response to rotation, such as is used in a manual camera lens. In another variation, the iris 30 may be a motorized iris. When the iris 30 is motorized, the controller 38 may be in communication with the iris 30 to provide command instructions such that the aperture size F is increased or decreased by the controller 38.

Thus, each lamp module 14 of the array 12 may be imaged onto the target plane 16 (e.g., the surface of a solar cell), as shown in FIG. 1. The baseline (full) spectrum of the illumination on the target plane 16 may be adjusted up or down by controlling the intensity of the full spectrum lamp modules 14A (FIG. 3), such as by manipulating the variable voltage/current devices 36 (FIG. 2) and/or the irises 30 (FIG. 2) for those lamp modules 14A. The spectral distribution of the illumination on the target plane 16 may be modified by controlling the intensity of lamp modules 14B, 14C, 14D, 14E, 14F, 14G (FIG. 3), such as by manipulating the variable voltage/current devices 36 (FIG. 2) and/or the irises 30 (FIG. 2) for those lamp modules 14B, 14C, 14D, 14E, 14F, 14G.

Figure 5:
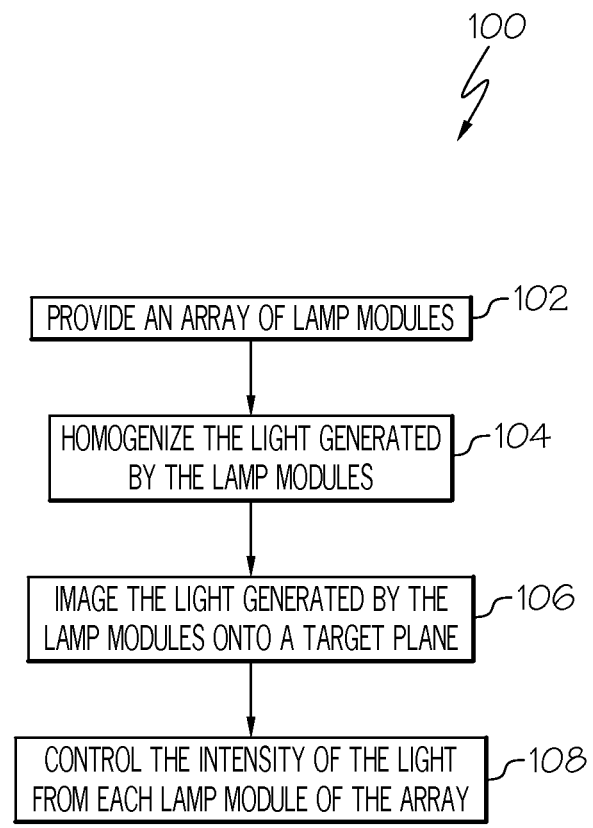
FIG. 5 is a flow chart illustrating one embodiment of the disclosed method for illuminating a target plane.

Also disclosed is a method for illuminating a target plane with artificial solar light. Referring to FIG. 5, in one particular embodiment, the disclosed method, generally designated 100, may begin at Block 102 with the step of providing an array of lamp modules. Each lamp module of the array may output either full spectrum illumination or illumination within a specific band.

At Block 104, the light output of each lamp module may be passed through a homogenizer. The homogenizer of each lamp module may ensure that the lamp module is outputting light having a uniform spatial distribution.

At Block 106, the array of lamp modules may be imaged onto the target plane. For example, each lamp module may include an imaging lens such that the light generated by that lamp module may be imaged onto the target plane and aligned with the imaged light from the other lamp modules.

At Block 108, the intensity of light from each lamp module may be controlled such that the illumination on the target plane has the desired spectral distribution. The intensity may be controlled at each individual lamp module by controlling the power supplied to that lamp module and/or by manipulating an iris through which the imaged light passes.

Accordingly, the disclosed method 100 may facilitate illuminating a target plane, such as the surface of a solar cell, with artificial solar light having the desired spectral distribution and that is spatially uniform. The spectral distribution may be controlled as desired by controlling the intensity of the light from the various lamp modules of the array. For example, the spectral distribution may be varied over time to mimic the variation observed as the sun moves across the sky (e.g., the amount of red light may be increased and decreased over time to mimic the differences between midday sunlight and setting sunlight).

Although various embodiments of the disclosed multi-lamp solar simulator and method have been shown and described, modifications may occur to those skilled in the art upon reading the specification. The present application includes such modifications and is limited only by the scope of the claims.

What is claimed is:

1. A solar simulator comprising:
   an array of lamp modules, wherein each lamp module of said array comprises:
   a lamp configured to generate light;
   a homogenizer having an input end and an output end;
   a beam divergence lens positioned to focus said light onto said input end of said homogenizer;
   an imaging lens positioned to receive said light from said output end of said homogenizer and image said light onto a target plane; and
   an iris positioned between said imaging lens and said target plane,
   wherein multiple images of said light from said each lamp module of said array overlap with each other on said target plane.

2. The solar simulator of claim 1 wherein said light is full spectrum light.

3. The solar simulator of claim 1 wherein said lamp comprises at least one of a xenon arc lamp and krypton arc lamp.

4. The solar simulator of claim 1 wherein said light generated by said lamp has an initial intensity, and wherein said initial intensity is variable.

5. The solar simulator of claim 4 wherein said lamp is electrically coupled to a power supply and said power supply is interrupted by a variable voltage/current device.

6. The solar simulator of claim 1 wherein said homogenizer comprises a diffuser proximate said input end.

7. The solar simulator of claim 1 wherein said output end of said homogenizer comprises a polished surface.

8. The solar simulator of claim 1 wherein said iris is motorized.

9. The solar simulator of claim 1 wherein each lamp module of said array further comprises a spectral filter.

10. The solar simulator of claim 9 wherein said spectral filter of at least one lamp module of said array is configured to provide substantially full spectrum illumination, and wherein at least another lamp module of said array is configured to provide a specific band of illumination.

11. The solar simulator of claim 10 wherein said lamp module configured to provide substantially full spectrum illumination is substantially centered within said array.

12. The solar simulator of claim 10 wherein said lamp module configured to provide a specific band of illumination is positioned proximate a periphery of said array.

13. The solar simulator of claim 9 wherein said spectral filter of at least one lamp module of said array is configured to provide substantially full spectrum illumination, and wherein at least another lamp module of said array is configured to provide one of a red band of illumination, a orange band of illumination, a yellow band of illumination, a blue band of illumination, a indigo band of illumination and a violet band of illumination.

14. The solar simulator of claim 1 wherein said array is configured in a hex pattern.

15. A solar simulator comprising:
a first lamp module comprising:
- a first lamp configured to generate a first light;
- a first spectral filter positioned to receive said first light and output substantially full spectrum light;
- a first homogenizer having a first input end and a first output end;
- a first beam divergence lens positioned to focus said full spectrum light onto said first input end of said first homogenizer;
- a first imaging lens positioned to receive said full spectrum light from said first output end of said first homogenizer and image said full spectrum light onto a target plane; and
- a first iris positioned between said first imaging lens and said target plane;

a second lamp module comprising:
- a second lamp configured to generate a second light;
- a second spectral filter positioned to receive said second light and output light within a specific, non-full spectrum band;
- a second homogenizer having a second input end and a second output end;
- a second beam divergence lens positioned to focus said specific band of light onto said second input end of said second homogenizer;
- a second imaging lens positioned to receive said specific band of light from said second output end of said second homogenizer and image said specific band of light onto said target plane; and
- a second iris positioned between said second imaging lens and said target plane; and
- a controller configured to control said first iris and said second iris.

16. The solar simulator of claim 15 further comprising a controller configured to control electrical energy supplied to said first lamp and said second lamp.

17. The solar simulator of claim 15 wherein said first lamp module and said second lamp module are configured in an array, and wherein said first lamp module is positioned proximate a center of said array.

18. A method for illuminating a target plane using an array of lamp modules, wherein each lamp module of said array outputs light having an intensity, said output light being one of a full spectrum light and a specific, non-full spectrum band of light, said method comprising the steps of:
- passing said light from each lamp module of said array through an associated homogenizer;
- imaging onto a target plane said homogenized light from each lamp module of said array, wherein multiple images of said homogenized light from said each lamp module of said array overlap with each other on said target plane; and
- controlling said intensity of said light from each lamp module of said array, wherein each lamp module of said array comprises an iris having a manipulatable aperture size, and wherein said controlling said intensity comprises manipulating said aperture sizes of said irises.

* * * * *